(12) United States Patent
Biswal et al.

(10) Patent No.: US 9,286,013 B2
(45) Date of Patent: Mar. 15, 2016

(54) PRINT SERVICE

(71) Applicant: HEWLETT-PACKARD DEVELOPMENT COMPANY, L.P., Houston, TX (US)

(72) Inventors: Bibhu Biswal, Bangalore (IN); Vishwanath RN, Bangalore (IN); Sibin Koothur, Bangalore (IN)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 87 days.

(21) Appl. No.: 13/875,581

(22) Filed: May 2, 2013

(65) Prior Publication Data

US 2014/0327929 A1 Nov. 6, 2014

(51) Int. Cl.
*G06F 3/12* (2006.01)
*H04L 29/08* (2006.01)

(52) U.S. Cl.
CPC ............. *G06F 3/1253* (2013.01); *G06F 3/122* (2013.01); *G06F 3/1204* (2013.01); *G06F 3/1228* (2013.01); *G06F 3/1264* (2013.01); *G06F 3/1268* (2013.01); *G06F 3/1287* (2013.01); *H04L 67/02* (2013.01); *G06F 3/1288* (2013.01)

(58) Field of Classification Search
CPC ... G06F 3/1253; G06F 3/1268; G06F 3/1228; G06F 3/122; G06F 3/1287; G06F 3/1264; G06F 3/1204; G06F 3/1288; H04L 67/02
USPC ......................................................... 358/1.15
See application file for complete search history.

(56) References Cited

U.S. PATENT DOCUMENTS

| | | | |
|---|---|---|---|
| 7,500,197 B2 | 3/2009 | Whitmarsh et al. | |
| 8,237,940 B2 | 8/2012 | Conescu et al. | |
| 2002/0145627 A1* | 10/2002 | Whitmarsh et al. | 345/745 |
| 2008/0079974 A1* | 4/2008 | Ferlitsch | 358/1.13 |
| 2012/0268777 A1 | 10/2012 | Fry | |
| 2013/0033722 A1* | 2/2013 | Kamath et al. | 358/1.15 |

FOREIGN PATENT DOCUMENTS

WO WO-2011006231 1/2011

OTHER PUBLICATIONS

Keenan Thomson; A Call for A Universal Mobile Print Solution; ENX Magazine Business Profile; Nov. 2012.
Lexmark, "Lexmark's cloud-based Print Release solution enables mobile printing from anywhere," Oct. 20, 2011, News Releases, <http://newsroom.lexmark.com/index.php?s=13630&item=70826>.

* cited by examiner

*Primary Examiner* — Kent Yip
(74) *Attorney, Agent, or Firm* — HP Inc. Patent Department (57) ABSTRACT

In an example implementation, a processor-readable medium stores code representing instructions that when executed by a processor cause the processor to receive at a print service, a print user interface (UI) request that identifies a web-enabled printer and a print access device, generate a native print UI document that includes print applications registered to the web-enabled printer, convert the native print UI document into a customized print UI document formatted in a UI description language supported by the print access device, and send the customized print UI document from the print service to the print access device.

20 Claims, 5 Drawing Sheets

PRINT SERVICE

BACKGROUND

As computer technology advances, printing remains a fundamental tool that provides many benefits, such as increased productivity in various business environments and improved user experiences with regard to different types of printable media, including photographs, news articles, magazines, text books, and so on. The proliferation of mobile computing devices has encouraged a corresponding increase in the use of web-enabled printers that allow users to print more easily from web and mobile sources. For example, web-enabled printers allow users with web-capable devices, such as phones and tablets, to attach a file to an email and send it to the printer. The printer can open the email and print the file document automatically, without any further connection or interaction with a computer. In addition, web-enabled printers typically include touch sensitive screens as user interfaces that allow users to connect to different web sites directly through the printer, and to print content from these sites such as news stories and articles. Many web-enabled printers can also be configured to print Web content directly from the printer by using special print applications that provide simple and fast printing of pre-formatted, print-ready, content.

BRIEF DESCRIPTION OF THE DRAWINGS

The present embodiments will now be described, by way of example, with reference to the accompanying drawings, in which.

DETAILED DESCRIPTION

Overview

As noted above, web-enabled printers allow users to print more easily from web and mobile sources through email attachments, direct connections to web sites, and special print applications that enable printing of pre-formatted, print-ready, content. The use of print applications to print Web content directly from web-enabled printers is an increasingly popular printing method, especially where such applications provide content on a scheduled basis (e.g., news articles, business articles). Web-enabled printers allow printer users to access a cloud-based print service and browse through numerous print applications that make large collections of print-ready content available for printing. Currently, such print applications are accessible through the front panel (e.g., touch sensitive display screen) of web-enabled printers. The remote print service projects a user interface (UI) onto the printer front panel showing which print applications and print-ready content are available for printing on the particular printer. Projecting the UI from the remote service onto the front panel of the printer helps to reduce printer hardware and software costs.

Unfortunately, many earlier web-enabled printers do not support such application-based printing from a remote print service. This is mostly due to the lack of a sophisticated user interface on such printers. In general, printers have front control panels, such as touch sensitive display screens, that provide a limited user interface that is restricted in terms of the rich widgets and layouts that other devices support. Accordingly, not only are many earlier web-enabled printers unable to support such print applications, most contemporary printer front panel control/display screens provide unsophisticated user interfaces that deliver an unsatisfying user experience. Indeed, in order to provide print services to a greater number of web-enabled printers, the UI document specification and UI description language used by the print service to project the UI onto a printer front panel is typically in a minimal format designed to function with the lowest end of available web-enabled printers. Because lower-end printers usually implement a less robust set of UI widgets and layouts, the reduced UI document specification format diminishes the user experience on all the web-enabled printers.

Thus, print application printing (i.e., application-based printing) from web-enabled printers through a cloud-based print service currently has several drawbacks. One drawback is that it lacks mobility, since the user experience is confined to the stationary location of the web-enabled printer (i.e., access is available at the printer front panel). In addition, the application-based printing is available to a limited segment of web-enabled printers, since many earlier web-enabled printers do not support it. Another drawback is that the experience is closely coupled to the printer front panel control/display screen which provides a limited user interface resulting in a poor user experience.

Accordingly, disclosed herein are example methods and devices implemented through a cloud-based print service that extend print application printing (i.e., application-based printing) to all appropriately configured web-enabled printers and to a wide variety of different computing devices. The print service enables a print application experience that is decoupled from the web-enabled printer's front panel and made accessible through various mobile and other computing devices, such as smartphones, tablets, laptops, desktops, and PC's. Thus, the user interface (UI) is no longer limited to an unsophisticated printer front panel, but instead can be implemented through more sophisticated displays and touch sensitive screens available on a variety of computing devices that support rich and robust UI widgets and layouts providing an improved user experience. A UI transform service enables transformation of the print service UI description language into an appropriate UI description language suitable for the target device that makes the initial print request. A search and tagging service indexes and ranks applications and content based on user interest as determined, for example, from user searches patterns and from print history associated with different print applications and content. The ranking helps put higher rated content at the top of the list of print application content being displayed on the device UI, which makes it easier for users to access and print that content. A personalized content analyzer also monitors individual usage behavior and generates customized UI views tailored to individual users, enabling improved access to more frequently used applications and content. The print service also provides a web portal that enables browsing of print applications and content, along with printing to web-enabled printers.

In an example implementation, a processor-readable medium stores code representing instructions that when executed by a processor cause the processor to receive at a print service, a print user interface (UI) request that identifies a web-enabled printer and a print access device, generate a native print UI document that includes print applications registered to the web-enabled printer, convert the native print UI document into a customized print UI document formatted in a UI description language supported by the print access device, and send the customized print UI document from the print service to the print access device.

In another example implementation, a print service includes a UI request manager to receive a print UI request from a print access device and to generate a native print UI document. The service also includes a UI transformer to convert the native print UI document into a customized print UI document formatted in a UI description language supported by the print access device.

In another example implementation, a processor-readable medium stores code representing instructions that when executed by a processor cause the processor to receive a print UI request, convert the print UI request into a native request formatted in a native UI description language, determine print applications registered to a web-enable printer identified within the print UI request, and generate a native print UI document that includes the registered print applications.

Illustrative Embodiments

Figure 1:
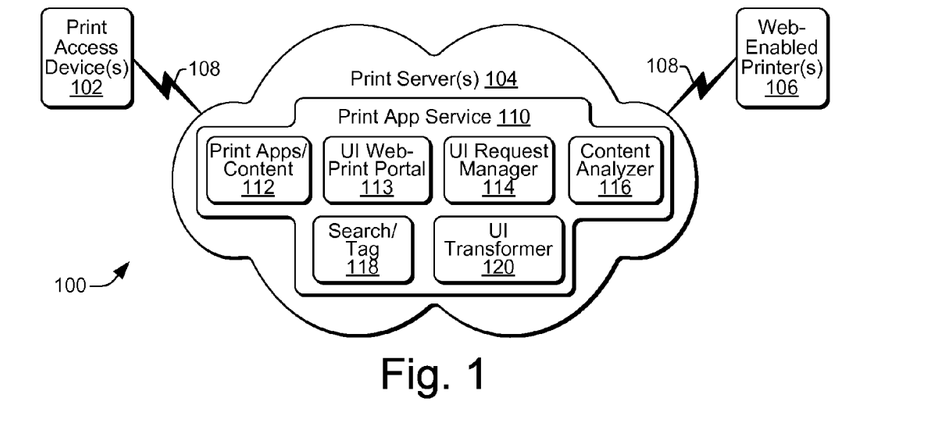
FIG. 1 shows a cloud computing environment suitable for implementing a print service that provides access to print applications and print content by web-enabled devices for printing on web-enabled printers, according to an example implementation.

FIG. 1 shows a cloud computing environment 100 suitable for implementing a print service that provides access to print applications and print content by web-enabled devices for printing on web-enabled printers, according to an example implementation. The environment 100 includes a web-enabled print access device 102, a remote network print server 104, and a web-enabled printer 106. Print access device 102 is intended to represent any of a variety of mobile (i.e., handheld) and/or stationary computing devices such as a smartphone, a PDA, a tablet computer, a notebook computer, a laptop computer, a desktop computer, an Internet appliance, combinations thereof, and so on. Printer 106 is intended to represent any of a variety of conventional printing devices, such as a laser printer, an inkjet printer, a single or multifunction printer, a large or small format printer, and so on.

Print access device 102 and printer 106 are web-enabled devices that may be local or remote with respect to one another, and that are capable of accessing print server 104 and other web resources through a network 108. In general, the terms web, Web, Internet and internet, are used interchangeably herein to signify the commonly known system of interconnected computers, computer networks, and associated services, documents and other resources linked by hyperlinks and URLs that are typically accessed by web browsers. Thus, web-enabled devices are generally capable of navigating the Web, connecting to different Web sites, downloading content from the Web, initiating applications on Web sites, running applications within a Web browser, and so on. Network 108 represents any of a variety of conventional network topologies and types (including optical, wired and/or wireless networks), employing any of a variety of conventional network protocols (including public and/or proprietary protocols). Network 108 may include or be a part of, for example, a home network, a corporate network, the cloud or the Web/Internet, as well as one or more local area networks (LANs) and/or wide area networks (WANs) and combinations thereof. Network 108 may also include a cable or other suitable local communication link.

As shown in FIG. 1, a print server 104 within the cloud environment 100 includes a print application service 110. The print application service 110 provides a library of print applications 112 that gives users direct access to pre-formatted Web content that can be printed on web-enabled printers 106. The print applications 112 format Web content such as text, photos, and graphics, into pre-formatted pages that users can choose to print directly to a web-enabled printer 106. Different print applications 112 provide easy access to different types of popular content. Some print applications 112 support content printing on a scheduled basis which allows users to print content automatically on set days and times. The print application service 110 includes additional features that help facilitate access to and use of the print applications 112, such as a connected UI Web-print portal 113, a print UI request manager 114, a personal content analyzer 116, a searching and tagging 118 component, and a UI transformer 120, as discussed further below.

Figure 2:
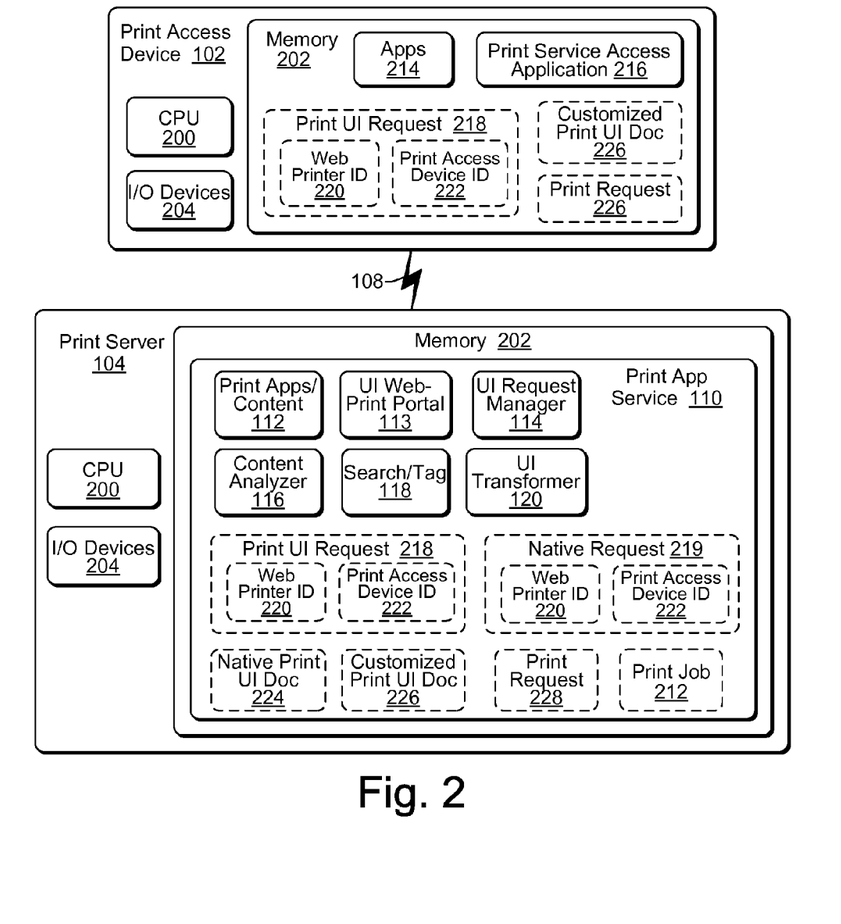
FIG. 2 shows components of a print access device and print server from the cloud the environment of FIG. 1, according to an example implementation.
Figure 3:
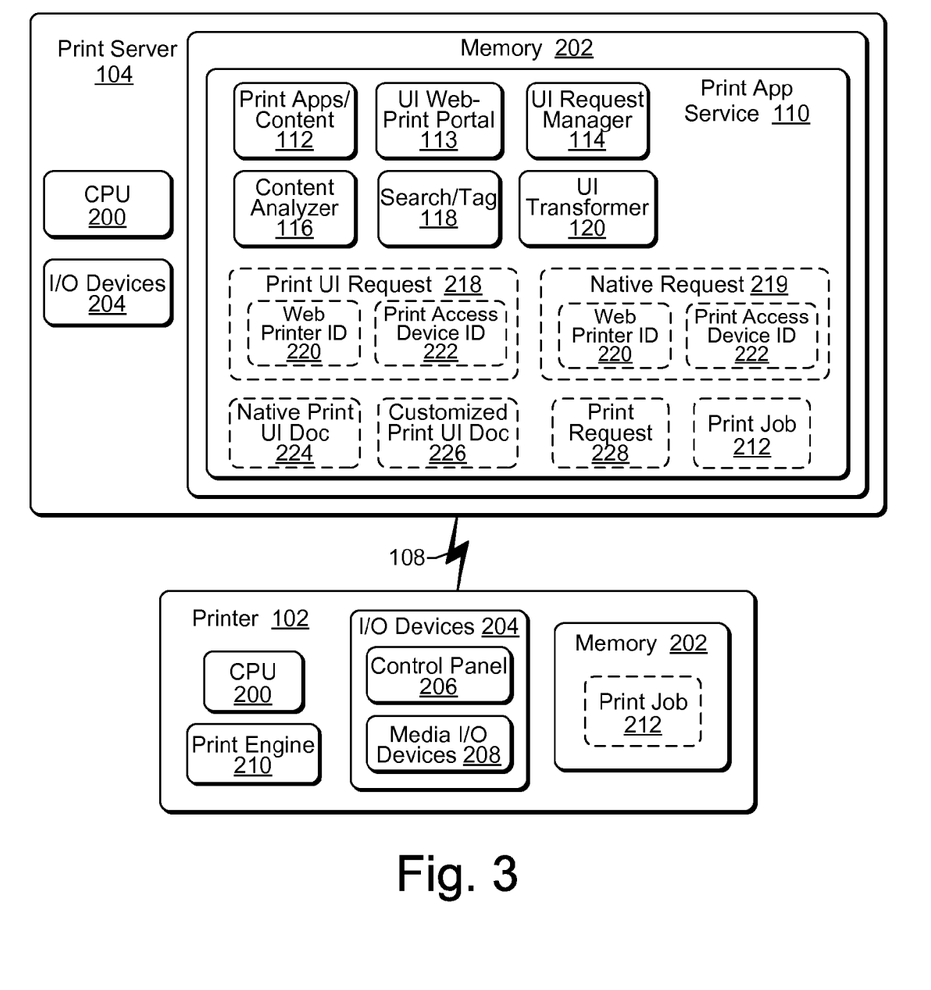
FIG. 3 shows components of the print server and a web-enabled printer from the cloud the environment of FIG. 1, according to an example implementation.

FIG. 2 shows components of a print access device 102 and print server 104 from the cloud the environment 100 in block diagram form, according to one aspect of an example implementation. The print access device 102 and print server 104 are in communication with one another over network 108. FIG. 3 shows components of the print server 104 and a web-enabled printer 106 from the cloud the environment 100 in block diagram, according to another aspect of an example implementation. The print server 104 and printer 106 are in communication with one another over network 108.

Referring generally to FIGS. 2 and 3, the print access device 102, print server 104, and web-enabled printer 106, each incorporate components of a typical computing device, such as one or more processors (CPU) 200, and a memory 202. A memory 202 typically includes both volatile (i.e., RAM) and nonvolatile (e.g., ROM, hard disk, floppy disk, CD-ROM, etc.) memory components. The memory components of memory 202 comprise non-transitory computer/processor-readable media that provide storage of computer/processor-executable coded instructions, such as program modules, applications, algorithms, data structures, and other data.

The print access device 102, print server 104, and web-enabled printer 106, also include various input/output (I/O) devices 204. For example, I/O devices 204 on a print access device 102 usually include a touch-sensitive display screen that implements an interactive key pad, icons and/or virtual buttons, and other text and graphics on the screen. Touch-sensitive display screens enable interactions with the print access device 102 using a finger or a stylus to contact the screen for purposes such as writing characters, drawing pictures, and selecting/clicking icons or virtual buttons to instruct a processor within the device 102 to execute instructions. Touch-sensitive display screens generally provide a robust user interface that enables simple navigation using intuitive gestures and high-resolution screens that are rich with detail and easy to read. In some implementations, I/O devices 204 on print access devices 102 can include a display screen with an accompanying hard key pad, speakers, a microphone, a camera, and so on.

A print server 104 may include I/O devices 204 similar to the print access device 102, but it also typically includes a keyboard, mouse, and display monitor. I/O devices 204 on web-enabled printers 106 usually include a control panel 206 that comprises a display screen with an accompanying hard key pad, or a touch-sensitive display screen. However, control panels 206 on web-enabled printers 106 usually provide a more limited UI that lacks the rich and robust features generally available on a print access devices 102. Web-enabled printers 106 also include other I/O devices 204, such as media input/output devices 208 comprising media trays and media rolls. In general, a web-enabled printer 106 generates printed output through a print engine 210 that translates commands from a print job 212 into an image that it prints onto media from media device 208.

Print access device 102 may implement various application programs 214 (i.e., by execution on a processor 200), such as word processing applications, spreadsheet applications, image editing applications, web browsing applications, and so on. Print access device 102 also implements a print service access application 216 that generates a print UI request 218. The print UI request 218 is sent to the print application service 110 on print server 104 to initiate printing on a web-enabled printer 106 through a print application 112. The print service access application 216 can be implemented as a variety of applications that enable the generation of a print UI request 218 in a variety of different UI markup language formats that are supported by different types of print access devices 102. Therefore, the print service access application 216 may depend to some degree on the type of device used to implement the print access device 102, and the manner in which a print UI request 218 is generated. For example, the print access device 102 may be a PC, and the print service access application 216 may be a Windows-based browser executing on the PC to generate a print UI request 218 in HTML (Hypertext Markup Language) format. Other examples of UI markup language formats include, but are not limited to, JSON, HTML 5, PHP, SQL, Java, QML, MXML, UIML, XUL, UsiXML, WTKX, XAL, SVG, TUIX, XAML, I3ML, OpenLaszlo (LZX), HMVCUL, WasabiXML, MARIA, and others used to execute native iOS-based applications, native Android-based applications, and so on.

Print server 104 implements a print application service 110 (i.e., by execution on a processor 200) that includes a number of components to facilitate printing on web-enabled printers 106 using special print applications 112. A UI Web-print portal 113, for example, enables users to browse available print applications 112, register appropriate print applications with web-enabled printers 106, activate print applications, and print content to web-enabled printers 106. Thus, as noted above, a print access device 102 may comprise a PC or other computer device that executes a Windows-based browser to generate an HTML-based print UI request 218 through the UI Web-print portal 113.

The print application service 110 includes a print UI request manager 114 that is generally configured to receive and respond to a print UI request 218 from a print access device 102. When responding to a print UI request 218, the print UI request manager 114 facilitates the generation of a customized UI document 226, which it sends to the print access device 102. One aspect of generating a customized UI document 226 involves organizing suitable print applications in a manner that considers the overall popularity and use of the print applications, as well as individual usage patterns demonstrated by a particular user. Another aspect of generating a customized UI document 226 involves formatting the UI document 226 in a language that is supported by the target print access device 102 that initiates the print UI request 218.

In general, a customized UI document 226 presents a view of a subset of print applications 112 that are suitable (i.e., that are registered) for use with the particular web-enabled printer 106 identified within the print UI request 218. When the customized UI document 226 is displayed on the print access device 102, the user can view, navigate, and select from the registered print applications. Upon receiving a print application selection from the user, the print service 110 returns information about what content is available for printing through the selected print application. The user can then send a print request 228 to the print service 110 to have content printed on the web-enabled printer 106, and the print service 110 sends a print job 212 to the printer 106 for processing.

Before generating a customized UI document 226, the UI request manager 114 first generates a native UI document 224. The native UI document 224 is formatted in a UI description language (e.g., XML) that is native to the print server. Using the UI transformer 120, the UI request manager 114 converts the native UI document 224 into a customized UI document 226. The UI transformer 120 is a component of the print service 110 that converts and repurposes the native print UI document 224 into a more sophisticated and customized UI document 226 formatted in a UI description language supported by a native application on the print access device 102 (e.g., HTML 5, Json). The UI transformer 120 accesses the appropriate widget and layout transformers for the native print UI document 224 based on the type and capabilities of the print access device 102. These transformers are pluggable components that are programmed to generate a rich user interface based on the particular print access device 102.

Figure 4A:
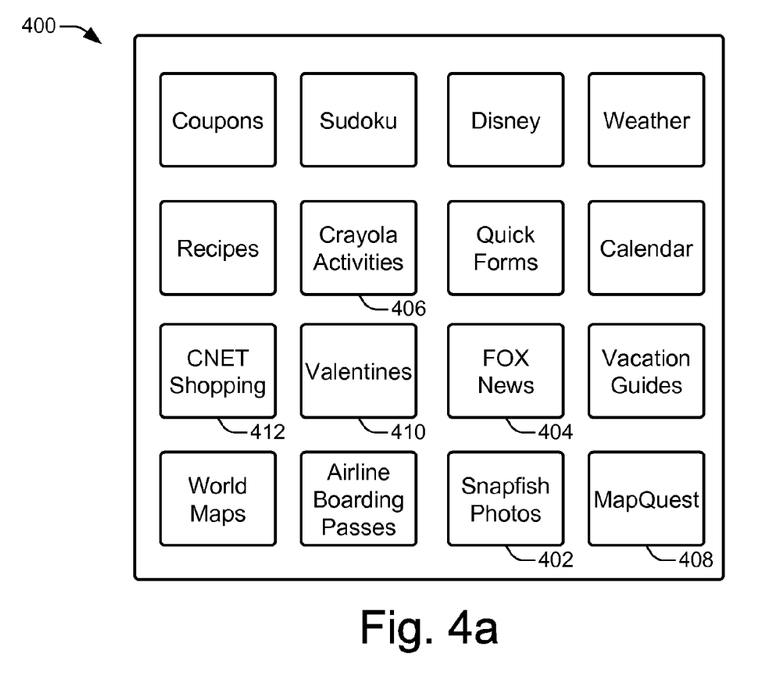
FIGS. 4a, 4b, and 4c, show examples of groups of print applications that are registered for use with a web-enabled printer, according to an example implementation.

Upon receiving a print UI request 218, the request manager 114 first configures, or converts, the request 218 into a native request 219 formatted in a native language understood by the print application service 110. For example, a print UI request 218 received in HTML 5 format may be converted into a native request 219 in an XML format supported by the print server 104. Each print UI request 218 includes a web-enabled printer identifier (ID) 220 or other credentials that uniquely identify a web-enabled printer 106. In general, ID credentials may include a variety of different identifiers, such as an email address, a MAC (media access control) ID, an IMEI (International Mobile Equipment Identity) ID, an IMS (International Mobile Subscriber) ID, and so on. The request manager 114 uses the printer ID 220 to determine which print applications 112 are suitable (i.e., registered) for use with the identified web-enabled printer 106. This can be done, for example, by accessing the personal content analyzer 116 to obtain information indicating which print applications 112 have been previously registered for use with the identified web-enabled printer 106. FIG. 4a shows an example of a group of print applications 400 that are registered for use with a web-enabled printer 106. In this example, the print applications 400 have not been organized or customized to appear in any particular order.

Each print UI request 218 also includes a print access device ID 222 or other credentials that uniquely identify the print access device 102 submitting the request 218. Such ID's and/or credentials may include a variety of different identifiers, such as an email address, a MAC (media access control) ID, an IMEI (International Mobile Equipment Identity) ID, an IMS (International Mobile Subscriber) ID, and so on. In general, the personal content analyzer 116 monitors user behavior with respect to the print application service 110 based on the print access device ID 222 within the request 218. For example, the personal content analyzer 116 records, stores, and analyzes which print applications 112 are used more frequently by the user of the device 102 which is identified by the device ID 222.

Figure 4B:
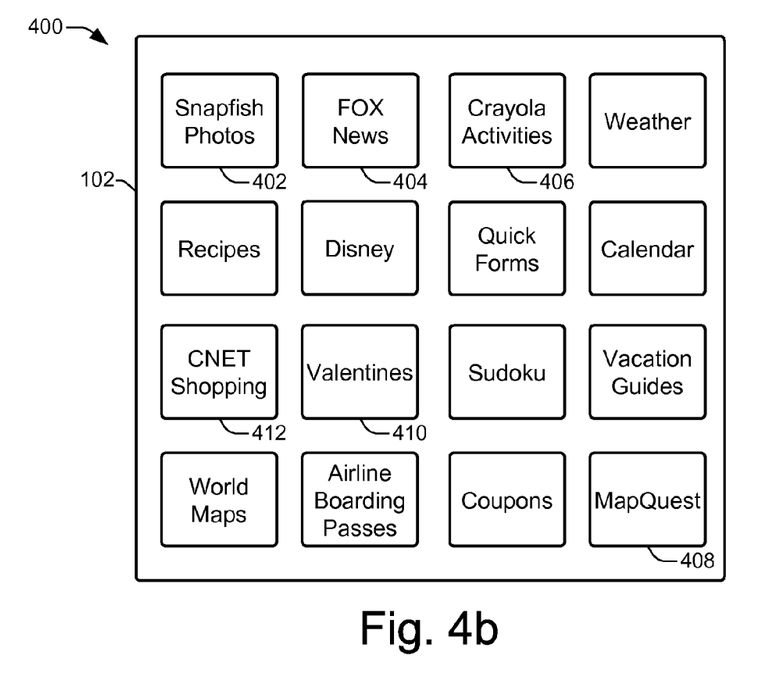

The personal content analyzer 116 may implement any available search and data analytics technology that interprets user interaction data and identifies usage patterns. One example of such technology is Autonomy's Intelligent Data Operating Layer (IDOL). Based on a user's prior use patterns, the content analyzer 116 can make content suggestions to the user and organize print applications within the customized UI document 226 so that more frequently used applications are presented in a more prominent manner, such as at the top of a list of print applications. Thus, in addition to determining from the personal content analyzer 116 which print applications 112 are registered for use with an identified web-enabled printer 106, the request manager 114 also uses information from the personal content analyzer 116 to organize the registered print applications 112 within the customized UI document 226 in a manner that enables easier navigation and faster access to the more frequently used print applications 112. FIG. 4b shows an example of the print applications 400 from FIG. 4a that have been organized within a customized UI document 226 based on usage information from the personal content analyzer 116. In this example, the more frequently used print applications (402, 404, and 406), appear toward the top of the display screen of a print access device 102 which provides easier access for the user to these applications.

Figure 4C:
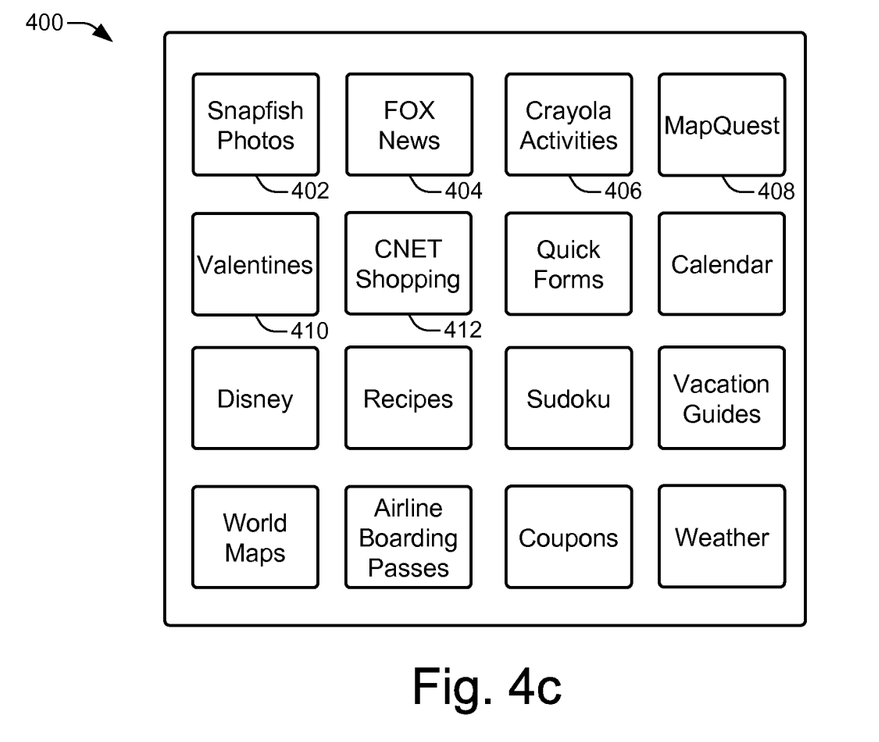

The print application service 110 also includes a search and tagging component 118. The search and tagging component 118 executes to index applications and contents based on popular search patterns and print history that indicates which print applications have been more widely used to print through the print application service 110. Based on the indexed content, the search and tag component 118 provides content ranking information to the request manager 114. For example, the more users search for applications and content, the higher those applications and content will be ranked. The request manager 114 uses the content ranking information to bring higher ranked applications and content to the top of the customized UI document 226. This enables easier access to higher rated content that the user can consume and print. FIG. 4c shows an example of the print applications 400 from FIG. 4a that have been organized within a customized UI document 226 based on both the usage information from the personal content analyzer 116, and the indexing information from the search and tagging component 118. In this example, a user's frequently used print applications (402, 404, and 406), appear toward the top of the display screen of a print access device 102, followed by applications that are more highly rated (408, 410, and 412) by the search and tagging indexing based on their general popularity and widespread use. It is noted that the appearance and organization of the print applications in FIGS. 4a, 4b, and 4c, are not intended as a limitation as to such appearance and organization, but are instead intended as one example. It should be understood that a customized UI document 226 may generate various other organizational schemes influenced by usage information from a personal content analyzer 116 and indexing information from a search and tagging component 118.

Figure 5:
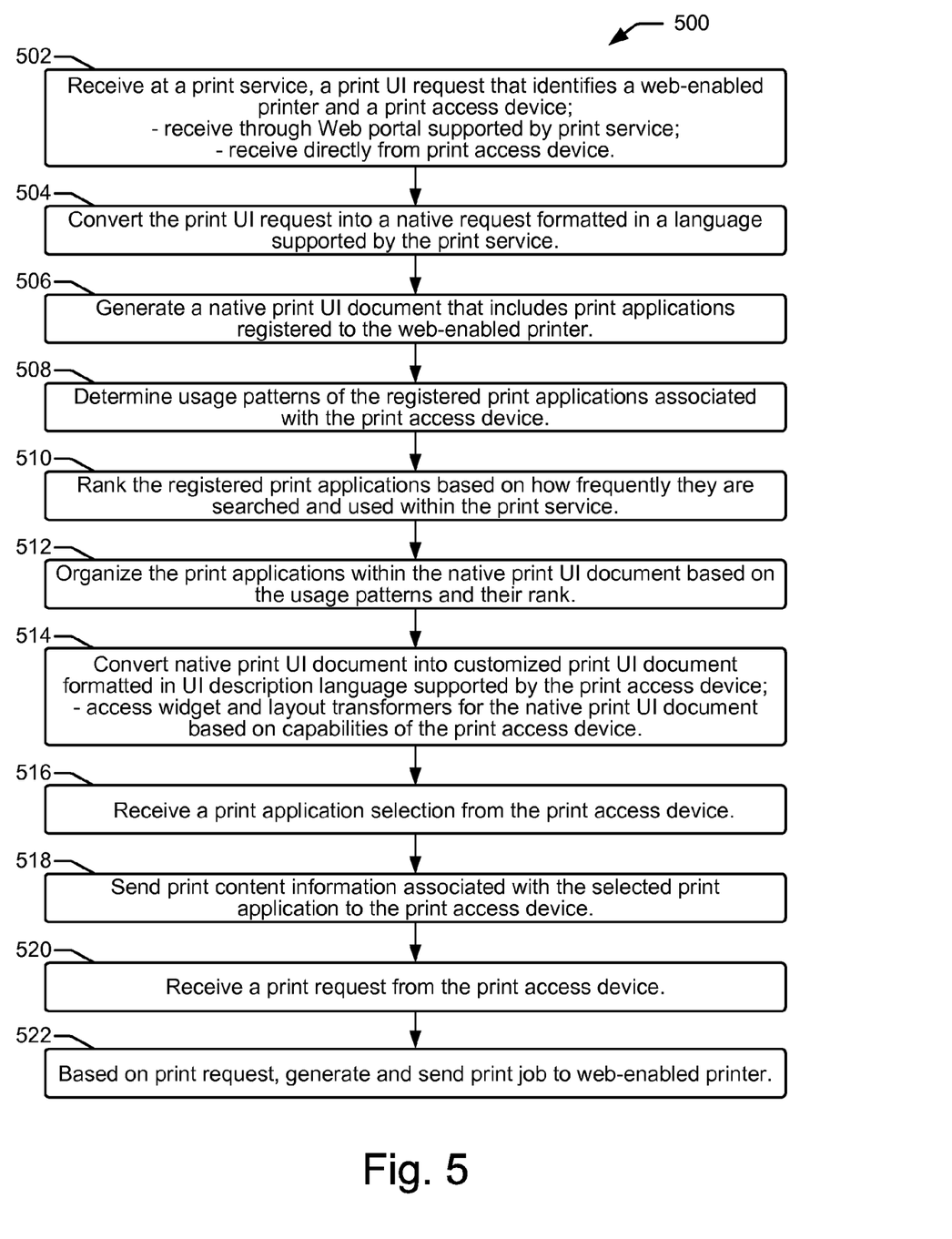
FIG. 5 shows a flowchart of an example method related to a print service within a cloud computing environment that provides access to print applications and print content by web-enabled devices for printing on web-enabled printers, according to an example implementation.

FIG. 5 shows a flowchart of an example method 500, related to a print service within a cloud computing environment that provides access to print applications and print content by web-enabled devices for printing on web-enabled printers, according to an example implementation. Method 500 is associated with the example implementations discussed above with regard to FIGS. 1-4, and details of the steps shown in method 500 can be found in the related discussion of such implementations. The steps of method 500 may be embodied as programming instructions stored on a non-transitory computer/processor-readable medium, such as memory 202 of FIGS. 2-3. In one example, implementing the steps of method 500 is achieved by the reading and execution of such programming instructions by a processor, such as processor 200 of FIGS. 2-3. Method 500 may include more than one implementation, and different implementations of method 500 may not employ every step presented in the flowchart of FIG. 5. Therefore, while steps of method 500 are presented in a particular order within the flowchart, the order of their presentation is not intended to be a limitation as to the order in which the steps may actually be implemented, or as to whether all of the steps may be implemented. For example, one implementation of method 500 might be achieved through the performance of a number of initial steps, without performing one or more subsequent steps, while another implementation of method 500 might be achieved through the performance of all of the steps.

Referring to FIG. 5, method 500 begins at block 502, with receiving a print UI (user interface) request that identifies a web-enabled printer and a print access device. The request is received at a print service, and it may be received through a Web portal supported by the print service, or directly from the print access device. At block 504, the method 500 continues with converting the print UI request into a native request formatted in a language supported by the print service. At block 506, a native print UI document is generated that includes print applications registered to the web-enabled printer. As shown at block 508, the method includes determining usage patterns of the registered print applications. The usage patterns are associated with how the applications have been used by the print access device. At block 510, the method 500 continues with ranking the registered print applications based on how frequently they are searched and used within the print service. The usage patterns and rankings are used to organize the print applications within the native print UI document, as shown at block 512. The method continues at block 514, with converting the native print UI document into a customized print UI document. The customized print UI document is formatted in a UI description language that is supported by the print access device. Formatting or customizing the print UI document can include accessing widget and layout transformers for the native print UI document based on capabilities of the print access device. At block 516, a print application selection is received by the print server from the print access device, and the print server sends print content information associated with the selected print application to the print access device, as shown at block 518. At block 520, a print request is received at the print service from the print access device, and the print server generates a print job based on the request and sends the job to web-enabled printer for processing.

What is claimed is:

1. A non-transitory processor-readable medium storing code representing instructions that when executed by a processor cause the processor to:

receive at a print service, a print user interface (UI) request including a web-enabled printer ID identifying a web-enabled printer, and a print access device ID identifying the print access device as a separate device from the web-enabled printer;

generate a native print UI document that includes a view of print applications registered to the web-enabled printer as determined according to the web-enabled printer ID, wherein each of the print applications manages different content from other ones of the print applications, and each of the print applications, when executed, displays the content managed by the print application for user selection and printing of user-selected content of the print application;

convert the native print UI document into a customized print UI document having a format including a UI description language supported by the print access device, wherein the format of the customized print UI document is determined based on the print access device ID; and send the customized print UI document from the print service to the print access device.

2. The non-transitory processor-readable medium of claim 1, wherein the instructions further cause the processor to:
convert the print UI request into a native request formatted in a language supported by the print service.

3. The non-transitory processor-readable medium of claim 1, wherein the instructions further cause the processor to:
determine usage patterns of the registered print applications associated with the print access device, wherein the usage patterns are tracked according to the print access device ID; and organize the print applications within the customized print UI document based on the usage patterns, wherein the organized print applications are displayed in the customized print UI document at the print access device.

4. The non-transitory processor-readable medium of claim 3, wherein the instructions further cause the processor to:
rank the registered print applications based on how frequently they are searched and used within the print service, wherein the print applications within the customized print UI document are organized based on their rank.

5. The non-transitory processor-readable medium of claim 1, wherein receiving a print UI request comprises:
receiving the print UI request through a Web portal supported by the print service.

6. The non-transitory processor-readable medium of claim 1, wherein the instructions further cause the processor to:
receive a print application selection from the print access device; and send the print content for the selected print application to the print access device.

7. The non-transitory processor-readable medium of claim 6, wherein the instructions further cause the processor to:
receive a print request from the print access device, wherein the print request includes user-selected content items of the print content for the selected print application; and based on the print request and the web-enabled printer ID, generate and send a print job to the web-enabled printer, wherein the web-enabled printer is to print the print content items in response to receiving the print job.

8. The non-transitory processor-readable medium of claim 6, wherein the print access device is a mobile device separate from the web-enabled printer.

9. A print service comprising:
at least one processor;
a UI request manager, executed by the at least one processor, to:
receive a print UI request from a print access device, wherein the print UI request includes a web-enabled printer ID identifying a web-enabled printer, and a print access device ID identifying the print access device as a separate device from the web-enabled printer;

determine print applications registered to the web-enabled printer according to the web-enabled printer ID; and generate a native print UI document that includes a view of the print applications, wherein each of the print applications manages different content from other ones of the print applications, and each of the print applications, when executed, displays the content managed by the print application for user selection and printing of user-selected content of the print application; and a UI transformer to convert the native print UI document into a customized print UI document formatted in a UI description language supported by the print access device, wherein a format of the customized print UI document is determined based on the print access device ID.

10. The print service as in claim 9, further comprising:
a personal content analyzer to determine usage patterns of the registered print applications, wherein the usage patterns are tracked according to the print access device ID, and wherein the registered print applications are organized within the customized print UI document based on the usage patterns, and the organized print applications are displayed in the customized print UI document at the print access device.

11. The print service as in claim 10, further comprising:
a search and tag component to rank the registered print applications based on a search frequency and a use frequency, wherein the registered print applications are organized within the customized print UI document based on their rank.

12. The print service as in claim 9, further comprising a UI Web print portal to enable browsing of print applications, registering print applications with a web-enabled printer, launching print applications, and printing content to a web-enabled printer.

13. The print service of claim 9, wherein the at least one processor is to:
receive a print application selection from the print access device; and send the print content for the selected print application to the print access device.

14. The print service of claim 13, wherein the at least one processor is to:
receive a print request from the print access device, wherein the print request includes user-selected content items of the print content for the selected print application; and based on the print request and the web-enabled printer ID, generate and send a print job to the web-enabled printer, wherein the web-enabled printer is to print the print content items in response to receiving the print job.

15. A non-transitory processor-readable medium storing code representing instructions that when executed by a processor cause the processor to:
receive a print UI request including a web-enabled printer ID identifying a web-enabled printer, and a print access device ID identifying a print access device as a separate device from the web-enabled printer;

convert the print UI request into a native request formatted in a native UI description language;

determine print applications registered to the web-enable printer as determined according to the web-enabled printer ID;

generate a native print UI document that includes a view of the registered print applications, wherein each of the registered print applications manages different content from other ones of the print applications, and each of the print applications, when executed, displays the content managed by the print application for user selection and printing of user-selected content of the print application; and convert the native print UI document into a customized print UI document formatted in a UI description language supported by the print access device, wherein a format of the customized print UI document is determined based on the print access device ID.

16. The non-transitory processor-readable medium as in claim 15, wherein the instructions further cause the processor to:
organize the registered print applications within the customized print UI document based on usage patterns and search patterns associated with the applications, wherein the usage patterns are tracked according to the print access device ID, wherein the organized print applications are displayed in the customized print UI document at the print access device.

17. The non-transitory processor-readable medium as in claim 15, wherein converting the native print UI document comprises accessing widget and layout transformers for the native print UI document based on the capabilities of the print access device.

18. The non-transitory processor-readable medium as in claim 16, wherein the instructions to organize the registered print applications comprise instructions to:
identify the registered print applications from the usage patterns; and
rank each of the identified, registered print applications from the usage patterns and the search patterns, wherein the print applications within the customized print UI document are organized in an order determined from the ranks.

19. The non-transitory processor-readable medium as in claim 15, wherein the instructions further cause the processor to:
receive a print application selection from the print access device; and
send the print content for the selected print application to the print access device.

20. The non-transitory processor-readable medium of claim 19, wherein the instructions further cause the processor to:
receive a print request from the print access device, wherein the print request includes user-selected content items of the print content for the selected print application; and
based on the print request and the web-enabled printer ID, generate and send a print job to the web-enabled printer, wherein the web-enabled printer is to print the print content items in response to receiving the print job.

* * * * *